Patented Apr. 5, 1938

2,113,374

UNITED STATES PATENT OFFICE 2,113,374

SALICYLIC ACID DERIVATIVES

Robert A. Hall, Brooklyn, N. Y., assignor to Colgate-Palmolive-Peet Company, Jersey City, N. J., a corporation of Delaware No Drawing. Application February 18, 1936, Serial No. 64,598

12 Claims. (Cl. 260—111)

This invention relates to new and improved therapeutic agents. It relates more particularly to reaction products of glycerin or other polyhydric alcohols and salicylic acid or alkyl esters of salicylic acid in which a substantial portion of the salicylic acid is etherified by the glycerin or polyhydric alcohol, and it includes a new process for the preparation of these products.

The therapeutic agents of the present invention are compounds of salicylic acid or an alkyl ester of salicylic acid and a polyhydric alcohol, a substantial portion of the composition consisting of ethereal derivatives of salicylic acid and a polyhydric alcohol, as distinguished from simple esters of salicylic acid and polyhydric alcohols. The products are advantageously produced by direct reaction between salicylic acid and a polyhydric alcohol in the presence of a suitable catalyst, and, while of somewhat indeterminate composition, contain a substantial portion of the ether of salicylic acid with the polyhydric alcohol selected, a proportion of the mixed ether-ester of salicylic acid with the polyhydric alcohol selected, that is, a proportion of a compound in which the polyhydric alcohol combines with the salicylic acid in such a way that water is eliminated between the hydroxy group of the salicylic acid and an hydroxy group of an alcohol molecule, while another molecule of water is eliminated between the carboxyl group of the salicylic acid and an hydroxy group of another polyhydric alcohol molecule, as well as a relatively small proportion of the simple ester of salicylic acid and the polyhydric alcohol. When an alkyl ester of salicylic acid, such as methyl salicylate, is used instead of salicylic acid, the product contains a substantial proportion of a polyhydric alcohol ether of the alkyl salicylate, and a proportion of the mixed ether-ester of salicylic acid and the polyhydric alcohol, as well as other products. The products also may contain minor proportions of poly-salicylates, but in general the formation of such products is repressed by using an excess of the polyhydric alcohol selected, in making the products.

The products of the present invention are useful as analgesics and anti-rheumatics. They have the virtues of known salicylates as therapeutic agents, and are particularly valuable for use where it is desirable to introduce salicylates into the blood stream by absorption through the skin, as they are more readily absorbed through the skin into the blood stream than other salicylates. This penetrating property of these compounds may be largely attributable to the presence of free hydroxyl groups in the molecule, and to the fact that the compounds are fat-soluble and have hydrophilic properties. The compounds also have the well known antiseptic and fungicidal property of salicylates, and are useful as analgesic antiseptics.

Among the alcohols which may be combined with salicylic acid or its alkyl esters to form the etherified products of the present invention, are included such polyhydric alcohols as glycerin, diethylene glycol and its monoethyl ether, ethylene glycol and its monoethyl ether, etc. When such polyhydric alcohols as glycerin are combined with the salicylic acid, only part of the hydroxyl groups of the alcohols are combined with the salicylic acid, leaving part of the hydroxyl groups free or combined with an alkyl group. The ethers of salicylic acid with polyhydric alcohols in which there is a free hydroxyl group, are particularly advantageous, since the presence of the free hydroxyl group tends to promote the absorption of the salicylic ether by the skin.

The invention will be illustrated by a detailed description of the production and properties of the compound produced from salicylic acid and glycerin, but the invention is not limited thereto.

The etherified product of salicylic acid and glycerin is advantageously produced by direct reaction between glycerin and salicylic acid in the presence of a catalyst. The amount of the catalyst employed is small, for example, around 1% or somewhat more of catalyst to 100 parts of the mixture of glycerin and salicylic acid to be combined.

As a catalyst, I have found it advantageous to use a small amount of the sulfuric acid ester of glycerin, such as glycerin monosulfate or glycerin disulfate or glycerin trisulfate, or the salts of these sulfates. The glycerin sulfates may be prepared separately and the proper amount added to the glycerin before the salicylic acid is added, or they may be prepared, for example, by adding sulfuric acid to the glycerin or by adding chlorsulfonic acid to the glycerin. I prefer, however, to prepare the catalyst separately and add it to the reaction mixture.

The glycerin, or other polyhydric alcohols, and the salicylic acid may be used in varying proportions, but the molar ratio of polyhydric alcohols to salicylic acid should be at least 2, and a greater amount of glycerin may be advantageously used.

The mixture of glycerin and salicylic acid, containing 2 or more molecular proportions of glycerin, to 1 of salicylic acid, with a small amount of added catalyst, such as those described above, is heated to promote the reaction, which is slow at room temperature but takes place readily at a higher temperature, such as that obtained on a steam or oil bath, i. e. a temperature above 100° C., and preferably around 125 to 150° C. The use of high temperatures, particularly with the aid of a vacuum, facilitates the removal of water formed by the reaction, and enables it to proceed more nearly to completion, particularly to completion of the etherification or reaction of the salicylic acid, which is advantageous, to insure the absence of free salicylic acid from the final product. Excessively high temperatures should be avoided, however, as there is danger of polymerization and darkening of the product at such high temperatures. With glycerin and salicylic acid, the best temperatures appear to be around 120 to 130° C., and the time of reaction, which varies with the temperature, from 6 to 8 hours or longer. During the reaction, any water present in the glycerin used as well as water formed by the reaction, will be driven off during the heating.

When the reaction is complete, or has been carried sufficiently far for practical purposes, the reaction product is cooled somewhat for further treatment. When some free salicylic acid is present in the reaction product, it is neutralized with alkali carbonate or hydroxide and the neutral product is washed with water, preferably at about 60 to 80° C. When an acid catalyst is used, this will be neutralized at the same time. The reaction product separates as an oily layer beneath the water and is drawn off and dried. This crude product is suitable for use directly as an ingredient of various therapeutic preparations. It may also be distilled in a high vacuum to give a colorless product. The unused glycerin and salicylic acid may be recovered from the wash water.

Instead of first neutralizing the reaction mixture, it may be cooled to a temperature below 100° C. and then washed by pouring it into cold water, with thorough agitation, the resulting mixture being allowed to separate into an aqueous layer and a heavier layer of glycerin salicylate which may be drawn off and further washed if desired; or the reaction mixture may be poured into salt water in which the reaction product is less soluble than it is in pure water.

The glycerin-salicylic acid reaction product, as prepared above, is a heavy, clear liquid which is slightly soluble in water, readily soluble in alcohol and most organic solvents, soluble in lipoids and fats, and is somewhat hydrophilic in nature. It is quite stable, and does not decompose on standing or storage. The product boils at 110° to 115° C. at 1 to 2 mm. pressure.

The product is, I believe, a composite product containing a substantial amount of glycerin salicylic ether, as well as the glycerin salicylic ether-ester, and a proportion of glycerin salicylate, i. e. the ester. While the exact composition of the product has not been determined, it seems to contain a substantial proportion of etherified salicylic acid, as well as a proportion of the esterified product.

Typical preparations containing the glycerin salicylic acid product will be shown in the following examples, which illustrate lotions and ointments containing the products which are useful for external application, for the treatment of such ailments as neuralgia, neuritis, rheumatism, etc., as well as for sprains, bruises, etc. A lotion may be prepared, for example, by compounding the following ingredients in the following proportions:

| | Parts by weight |
|---|---|
| Stearic acid | 1 to 3 |
| Lanolin | 1 to 3 |
| Beeswax | 1 to 3 |
| Glycerin-salicylic acid reaction product | 20 to 25 | by separately compounding about 0.75 part by weight of triethanolamine with an amount of water which will make, with the other ingredients, 100 parts by weight, by separately heating the two compounds thus prepared to about 185° to 190° F. and then adding the first preparation to the second, while agitating and maintaining the temperature, and then, after thorough admixture, permitting the composition to cool with continued slow agitation until the temperature drops to around 140° F., at which point a suitable perfume is added and the agitation is continued until the lotion reaches room temperature.

A cream may be similarly compounded from the following ingredients, using first a composition containing the following materials in the following proportions:

| | Parts by weight |
|---|---|
| Stearic acid | 16 to 18 |
| Lecithin | 1 to 2 |
| Lanolin | 3 to 4 |
| Glycerin salicylic acid reaction products | 15 to 20 | heating this composition to around 185° to 190° F., and adding to it water containing 0.5 to 1 part by weight of triethanolamine, using enough water to make up 100 parts of the total composition, and combining the two mixtures as described for the lotion above.

A suitable oil-type composition may be prepared from the following ingredients in the following proportions:

| | Parts by weight |
|---|---|
| Mineral oil (liquid) | 70 to 75 |
| Glycerin salicylic acid reaction products | 20 to 25 |

To a mixture of these ingredients may be added suitable coloring material and perfume, and the whole may be blended to a uniform composition. Preferably the mineral oil and the glycerin salicylic acid reaction product are thoroughly admixed before the addition of coloring matter and perfume. A suitable alcoholic type composition may be prepared by adding 10 to 25 parts by weight of glycerin-salicylic acid reaction product to sufficient alcohol to make 100 parts by weight, with the addition of suitable perfume and coloring matter. The alcohol used may be an aqueous alcohol, containing up to 50% of water, for example.

In a similar manner, other reaction products (etherified products) of salicylic acid and polyhydric alcohols, such as reaction products of salicylic acid with ethylene glycol, ethylene glycol monoethyl ether, diethylene glycol, diethylene glycol monoethyl ether, etc., may be employed. These may be prepared by processes similar to those described in detail for the production of the glycerin-salicylic acid compound above. Also, alkyl esters of salicylic acid, such as methyl salicylate, may be used instead of salicylic acid to produce corresponding etherified products, the same catalysts and reaction conditions being used.

The compounds of the present invention, because of their fat-solubility properties and their hydrophilic properties, are readily absorbed through the skin, whether applied to the skin as a solution or in a cream or ointment, or even when directly applied to the skin, as by simply spreading the liquid glycerin salicylic acid reaction product on the skin, and provide a simple and rapid means of transmitting salicylates to the blood stream without danger of the gastric disturbances frequently attendant upon the oral administration of salicylates.

In preparing the therapeutic compositions, it is not essential to completely purify the reaction product of the glycerin or other polyhydric alcohol and the salicylic acid, as an excess of polyhydric alcohol is generally used, and the presence of this alcohol in the final product is generally unobjectionable. It is, however, desirable to neutralize any excess salicylic acid or acid catalyst which may be used, but, for many products, the presence of a very small amount of a salt of salicylic acid or of the acid catalyst, together with excess polyhydric alcohol, is not objectionable, and it is not always necessary to remove these products from the composition before use.

The therapeutic products of the present invention are not only useful for treatment of ailments in which it is desirable to produce a definite concentration of salicylate in the blood stream, but is also useful for the treatment of such things as superficial burns and sunburn, where the analgesic and antiseptic properties of the composition are of value. The products are also valuable as anti-sunburn preparations, as they have a definite tendency to prevent the passage of ultra-violet rays of the wave length which produces sunburn, thus tending to prevent sunburn and to protect the skin against the sun and also have an analgesic and soothing action on the skin which has been sunburned.

I claim:

1. The process which comprises reacting a polyhydric alcohol with a member of the group consisting of salicylic acid and its alkyl esters, in the presence of a sulfate of a polyhydric alcohol substantially free from sulfuric acid.
2. The process which comprises reacting a polyhydric alcohol with a member of the group consisting of salicylic acid and its alkyl esters, in the presence of a sulfate of the polyhydric alcohol substantially free from sulfuric acid.
3. The process which comprises reacting glycerin with a member of the group consisting of salicylic acid and its alkyl esters, in the presence of a sulfate of a polyhydric alcohol substantially free from sulfuric acid.
4. The process which comprises reacting glycerin with a member of the group consisting of salicylic acid and its alkyl esters, in the presence of a glycerin sulfate substantially free from sulfuric acid.
5. The process which comprises reacting glycerin with salicylic acid, in the presence of a sulfate of a polyhydric alcohol substantially free from sulfuric acid.
6. The process which comprises reacting a polyhydric alcohol with a member of the group consisting of salicylic acid and its alkyl esters, in the presence of a sulfate of the polyhydric alcohol substantially free from sulfuric acid and washing the reaction product.
7. The process which comprises reacting glycerin with salicylic acid, in the presence of a sulfate of a polyhydric alcohol substantially free from sulfuric acid and washing the reaction product.
8. The products of claim 4.
9. The products of claim 6.
10. Compounds of the formula

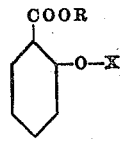

in which R is a radical of the class consisting of hydrogen and alkyl radicals and X is a polyhydric alcohol residue.

11. Compounds of the formula

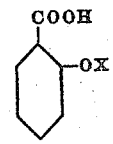

in which X is a polyhydric alcohol residue.

12. Compounds of the formula

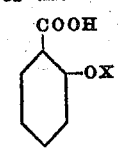

in which X is a glycerin residue.

ROBERT A. HALL.